United States Patent [19]
Shimizu

[11] Patent Number: 6,120,110
[45] Date of Patent: Sep. 19, 2000

[54] BRAKE FORCE CONTROL DEVICE

[75] Inventor: Satoshi Shimizu, Toyota, Japan

[73] Assignee: Toyota Jidosha Kabushiki Kaisha, Toyota, Japan

[21] Appl. No.: 09/171,498

[22] PCT Filed: Apr. 22, 1997

[86] PCT No.: PCT/JP97/01381

§ 371 Date: Oct. 20, 1998

§ 102(e) Date: Oct. 20, 1998

[87] PCT Pub. No.: WO97/39926

PCT Pub. Date: Oct. 30, 1997

[30] Foreign Application Priority Data

Apr. 23, 1996 [JP] Japan ................................. 8-101604

[51] Int. Cl.[7] .............................. B60T 7/12; B60T 8/00; B60T 8/32; B60T 13/52; B60T 13/66
[52] U.S. Cl. .................................. 303/113.4; 188/DIG. 1; 303/125; 303/155; 303/191; 303/113.1; 303/DIG. 3; 303/DIG. 4; 303/166; 303/177
[58] Field of Search ................................. 303/125, 113.4, 303/114.3, 113.3, 113.2, 171, 15, 174, 176, 166–167, DIG. 3, DIG. 4, 155, 3, 113.1, 116.1–119.1, 20, 135, 191, 177, 199, 157, 158, 156, 122.11–122.13; 701/70, 78; 188/DIG. 1, DIG. 2

[56] References Cited

U.S. PATENT DOCUMENTS

| | | |
|---|---|---|
| 4,774,667 | 9/1988 | Kuraoka et al. . |
| 5,158,343 | 10/1992 | Reichelt et al. . |
| 5,261,730 | 11/1993 | Steiner et al. . |
| 5,350,225 | 9/1994 | Steiner et al. . |
| 5,367,942 | 11/1994 | Nell et al. . |
| 5,427,442 | 6/1995 | Heibel . |
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,539,641 | 7/1996 | Littlejohn ................................. 303/20 |

(List continued on next page.)

FOREIGN PATENT DOCUMENTS

| | | |
|---|---|---|
| 0711695 | 5/1996 | European Pat. Off. . |
| 4028290 | 1/1992 | Germany . |
| 61-268560 | 11/1986 | Japan . |
| 4028290 | 9/1990 | Japan . |
| 3-227766 | 10/1991 | Japan . |
| 4-121260 | 4/1992 | Japan . |
| 4-1212660 | 4/1992 | Japan . |
| 5-97022 | 4/1993 | Japan . |
| 7-76267 | 3/1995 | Japan . |
| 7-329766 | 12/1995 | Japan . |
| 8-34326 | 2/1996 | Japan . |
| 8-40229 | 2/1996 | Japan . |
| 8-207725 | 8/1996 | Japan . |
| 8-295224 | 11/1996 | Japan . |
| 9-48340 | 2/1997 | Japan . |
| 9-95232 | 4/1997 | Japan . |
| 9-123900 | 5/1997 | Japan . |
| 2282649 | 4/1995 | United Kingdom . |
| 2295209 | 5/1996 | United Kingdom . |
| WO96/6763 | 3/1996 | WIPO . |

*Primary Examiner*—Douglas C. Butler
*Attorney, Agent, or Firm*—Kenyon & Kenyon

[57] ABSTRACT

A brake assist control for generating a brake force greater than that of a normal time is performed. It is determined (102) that a brake pedal is operated at a high speed when a rate of change $\Delta P_{M/C}$ of a master cylinder pressure $P_{M/C}$ exceeds a first threshold value $\alpha$. When the cause of the braking operation is an external disturbance, the rate of change $\Delta P_{M/C}$ the rate of change $\Delta P_{M/C}$ changes immediately thereafter. When a period during which the rate of change $\Delta P_{M/C}$ becomes less than a second threshold value $\beta$ is shorter than a predetermined period $T_0$, it is determined that the cause of the braking operation is the external disturbance such as a rough road or a step and an execution of the brake assist control is prohibited (104, 108, 110, 112).

9 Claims, 6 Drawing Sheets

U.S. PATENT DOCUMENTS

| | | |
|---|---|---|
| 5,549,369 | 8/1996 | Rump et al. . |
| 5,556,173 | 9/1996 | Steiner et al. . |
| 5,564,797 | 10/1996 | Steiner et al. . |
| 5,567,021 | 10/1996 | Gaillard . |
| 5,584,542 | 12/1996 | Klarer et al. . |
| 5,586,814 | 12/1996 | Steiner . |
| 5,607,209 | 3/1997 | Narita et al. ............... 303/122.11 |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,762,407 | 6/1998 | Stacey et al. ...................... 303/155 |
| 5,772,290 | 6/1998 | Heibel et al. . |
| 5,779,329 | 7/1998 | Takeshima ........................ 303/155 |
| 5,890,776 | 4/1999 | Sawada ............................. 303/166 |
| 5,931,545 | 8/1999 | Yonemura et al. ................ 303/155 |
| 5,961,188 | 10/1999 | Sawada ........................... 303/116.1 |
| 5,978,725 | 11/1999 | Kagawa ............................. 701/70 |

FIG. 6

BRAKE FORCE CONTROL DEVICE

TECHNICAL FIELD

The present invention relates to a brake force control apparatus and, more particularly, to a brake force control apparatus which changes a brake force generated in association with a braking operation based on an operational speed of the brake.

BACKGROUND ART

Conventionally, for example, as disclosed in Japanese Laid-Open Patent Application 4-121260, a brake force control apparatus which generates, when an emergency braking is required, a brake force greater than that generated in a normal time is known. The above-mentioned conventional apparatus comprises a brake booster that generates a pressing force having a predetermined power ratio with respect to a brake pressing force $F_P$. The pressing force of the brake booster is transmitted to a master cylinder. The master cylinder generates a master cylinder pressure $P_{M/C}$ corresponding to the pressing force of the brake booster, that is, the brake pressing force $F_P$.

Additionally, the above-mentioned conventional apparatus comprises a fluid pressure generating mechanism that generates an assist hydraulic pressure by a pump as a fluid pressure source. The fluid pressure generating mechanism generates the assist hydraulic pressure which corresponds to a drive signal provided by a control circuit. The control circuit determines that an emergency braking operation is performed by a driver when a brake pedal is operated at a speed exceeding a predetermined speed, and outputs to the fluid pressure generating mechanism a drive signal which requires a maximum assist hydraulic pressure. The assist hydraulic pressure generated in the fluid pressure generating mechanism is provided to a change valve together with the master cylinder pressure $P_{M/C}$. The change valve provides one of the assist hydraulic pressure generated by the fluid pressure generating mechanism and the master cylinder pressure $P_{M/C}$ which is higher than the other to a wheel cylinder.

According to the above-mentioned apparatus, when the brake pedal is operated at a speed smaller than the predetermined operational speed, the master cylinder pressure $P_{M/C}$ which is adjusted to a fluid pressure corresponding to the brake pressing force $F_P$ is provided to the wheel cylinder. Hereinafter, a control for establishing this state is referred to as a normal control. Additionally, when the brake pedal is operated at a speed exceeding the predetermined operational speed, the assist hydraulic pressure, which is a high pressure generated by the pump as a fluid pressure source, is provided to the wheel cylinder. Hereinafter, a control for increasing the fluid pressure provided to the wheel cylinder in accordance with the operational state of the brake pedal by a driver is referred to as a brake assist control. Thus, according to the above-mentioned conventional apparatus, a brake force can be controlled to a degree corresponding to the brake pressing force F P in a normal time, and the brake force can be immediately and rapidly increased after an emergency braking operation is detected.

However, the brake pedal may be pressed at a high speed despite that a driver does not intend to perform an emergency braking operation when the vehicle is moving on a rough road or a vehicle overrides a step in addition to a case where the driver intends to perform an emergency braking operation. The above-mentioned conventional apparatus always determines that an emergency braking operation is being performed when an operational speed of the brake pedal exceeds the predetermined value. Accordingly, the above-mentioned conventional apparatus has a characteristic that an emergency braking operation tends to be erroneously detected when the vehicle moves on a rough road or passes a step.

DISCLOSURE OF INVENTION

The present invention is invented in view of the above-mentioned point, and it is an object of the present invention to provided a brake force control apparatus which prohibits to change a brake force if it can be determined that a driver does not intend to perform an emergency braking operation even when a braking operation is performed at a high speed.

A brake force control apparatus achieving the above-mentioned objects performs the brake assist control for adjusting the wheel cylinder pressure to a fluid pressure greater than that of a normal time when an emergency braking operation is performed by a driver. In the brake force control apparatus according to the present invention, it is determined that an emergency braking operation is performed when an operational speed of the brake exceeding a predetermined value is detected. When the emergency braking operation is detected, it is determined whether a cause of the operation is an intentional braking operation by a driver or an external disturbance. As a result, if the cause of the emergency braking operation is an external disturbance, the brake assist control is prevented from being performed.

In the present invention, when the driver performs an emergency braking operation, an operational speed of the brake, which is a high speed, is generated. The operational speed of the brake becomes a high speed instantaneously when the vehicle is moving on a rough road or a vehicle passes a step in addition to a case where an emergency braking operation is performed by the driver.

According to the present invention, if a cause of an emergency braking operation is an external disturbance, an execution of the brake assist control can be prohibited. Thus, according to the present invention, an execution of the brake assist control due to an external disturbance such as a rough road or a step is prevented from being unnecessarily performed.

BEST MODE FOR CARRYING OUT THE INVENTION

Figure 1:
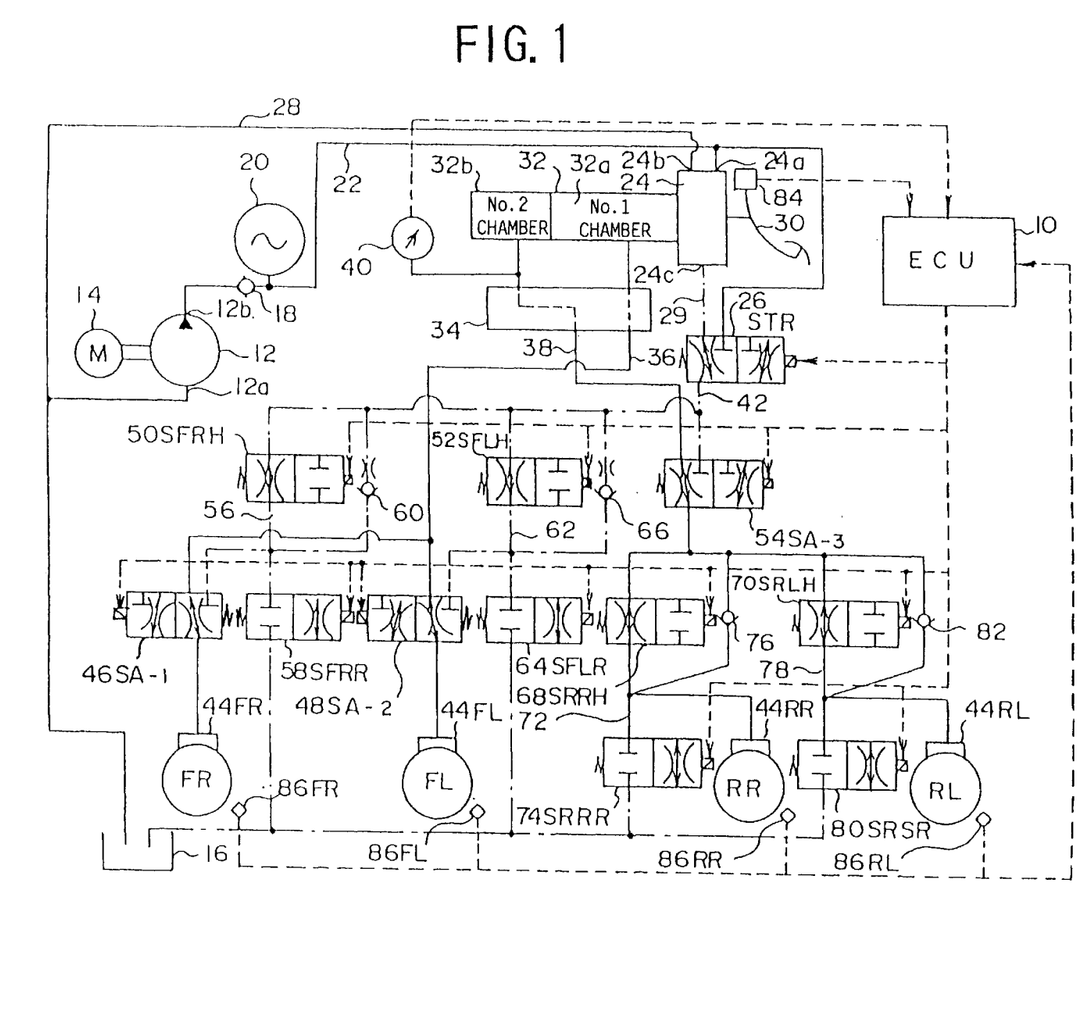
FIG. 1 is a system structure diagram of a brake force control apparatus according to an embodiment of the present invention.

FIG. 1 is a system structure diagram of a brake force control apparatus according to an embodiment of the present invention. The brake force control apparatus shown in FIG. 1 is controlled by an electronic control unit 10 (hereinafter, referred to as ECU 10). The brake force control apparatus comprises a pump 12. The pump 12 has a motor 14 as a power source thereof. An inlet port 12a of the pump 12 communicates with a reservoir tank 16. An accumulator 20 communicates with an outlet port 12b of the pump via a check valve 18. The pump 12 delivers brake fluid in the reservoir tank 16 from the outlet port 12b so that a predetermined pressure is always accumulated in the accumulator 20.

The accumulator 20 communicates with a high-pressure port 24a of a regulator 24 via a high-pressure passage 22, and communicates with a regulator switching solenoid 26 (hereinafter, referred to as STR 26). The regulator 24 has a low-pressure port 24b and a control fluid pressure port 24c. The low-pressure port 24b communicates with the reservoir tank 16 via a low-pressure passage 28. The control fluid pressure port 24c communicates with the STR 26 via a control fluid pressure passage 29. The STR 26 is a two-position solenoid valve which selectively set one of the control fluid pressure passage 29 and the high-pressure passage 22 in a conductive state, and sets the control fluid pressure passage 29 in a conductive state and sets the high-pressure passage 22 in a closed state in a normal state.

A brake pedal 30 is connected to the regulator 24, and a master cylinder is mounted to the regulator 24. The regulator 24 has a fluid pressure chamber therein. The fluid pressure chamber always communicates with the control fluid pressure port 24c, and selectively communicates with the high-pressure port 24a or the low-pressure port 24b in accordance with an operational state of the brake pedal 30. The regulator 24 is configured so that a pressure inside the fluid pressure chamber is adjusted to a fluid pressure corresponding to a brake pressing force FP exerted on the brake pedal 30. Accordingly, the fluid pressure corresponding to the brake pressing force FP always appears at the control fluid pressure port 24c of the regulator 24. Hereinafter, this fluid pressure is referred to as a regulator pressure PRE.

The brake pressing force FP exerted on the brake pedal 30 is mechanically transmitted to a master cylinder 32 via the regulator 24. Additionally, a force corresponding to the fluid pressure inside the fluid pressure chamber of the regulator 24, that is, a force corresponding to the regulator pressure PRE, is transmitted to the master cylinder 32.

The master cylinder 32 is provided with a first fluid pressure chamber 32a and a second fluid pressure chamber 32b therein. A master cylinder pressure PM/C corresponding to a resultant force of the brake pressing force FP and a brake assist force FA is generated in the first fluid pressure chamber 32a and the second fluid pressure chamber 32b. Both the master cylinder pressure PM/C generated in the first fluid pressure chamber 32a and the master cylinder pressure PM/C generated in the second fluid pressure chamber 32b are supplied to a proportioning valve 34 (hereinafter, referred to as P valve 34).

The P valve 34 communicates with a first fluid pressure passage 36 and a second fluid pressure passage 38. The P valve 34 supplies the master cylinder pressure PM/C to the first fluid pressure passage 36 and the second fluid pressure passage 38 without change in an area where the master cylinder pressure PM/C is less than a predetermined value. Additionally, the P valve 34 supplies the master cylinder pressure PM/C to the first fluid pressure passage 36 without change and supplies a fluid pressure obtained by decreasing the master cylinder pressure PM/C by a predetermined ratio to the second fluid pressure passage 38 in a range where the master cylinder pressure PM/C is less than a predetermined value.

A hydraulic pressure sensor 40, which outputs an electric signal corresponding the master cylinder pressure PM/C, is provided between the master cylinder 32 and the P valve 34. An output signal of the hydraulic pressure sensor 40 is supplied to the ECU 10. The ECU 10 detects the master cylinder pressure PM/C generated in the master cylinder 32 based on the output signal of the hydraulic pressure sensor 40.

The above-mentioned STR 26 communicates with a third fluid pressure passage 42. The third fluid pressure passage 42 communicates with one of the control fluid pressure passage 29 and the high-pressure passage 22 in accordance with a state of the STR 26. In the present embodiment, wheel cylinders 44FL and 44FR provided to left and right front wheels FL and FR are provided with a brake fluid pressure from the first fluid pressure passage 36 communicating with the P valve 34 or the third fluid pressure passage 42 communicating with the STR 26. Additionally, wheel cylinders 44RL and 44RR provided to left and right rear wheels RL and RR are provided with a brake fluid pressure from the second fluid pressure passage 38 communicating with the P valve 34 or the third fluid pressure passage 42 communicating with the STR 26.

The first fluid pressure passage 36 communicates with a first assist solenoid valve 46 (hereinafter referred to as SA-1 46) and a second assist solenoid valve 48 (hereinafter, referred to as SA-2 48). On the other hand, the third fluid pressure passage 42 communicates with a right front holding solenoid valve 50 (hereinafter, referred to as SFRH 50), a left front holding solenoid valve 52 (hereinafter, referred to as SFLH 52) and a third assist solenoid valve 54 (hereinafter, referred to as SA-3 54).

The SFRH 50 is a two-position solenoid valve which maintains an open state in a normal state. The SFRH 50 communicates with the SA-1 46 and a right front wheel pressure decreasing solenoid valve 58 (hereinafter, referred to as SFRR 58) via a pressure adjusting fluid pressure passage 56. A check valve 60 permitting a fluid flow only in a direction from the pressure adjusting fluid pressure passage 56 to the third fluid pressure passage 42 is provided, in parallel, between the third fluid pressure passage 42 and the pressure adjusting fluid pressure passage 56.

The SA-1 46 is a two-position solenoid valve which selectively renders one of the first fluid pressure passage 36 and the pressure adjusting fluid pressure passage 56 to communicate with the wheel cylinder 44FR, and renders the first fluid pressure passage 36 and the wheel cylinder 44FR to be in a communicating state in a normal state (OFF state). On the other hand, the SFRR 58 is a two-position solenoid valve which renders the pressure adjusting fluid pressure passage 56 and the reservoir tank 16 to be in a connected state or a disconnected state. The SFRR 58 renders the pressure adjusting fluid pressure passage 56 and the reservoir tank 16 to be in a disconnected state in a normal state (OFF state).

The SFLH 52 is a two-position solenoid valve which maintains an open state in a normal state. The SFLH 52 communicates with the SA-2 48 and a left front wheel pressure decreasing solenoid valve 64 (hereinafter, referred to as SFLR 64) via a pressure adjusting fluid pressure passage 62. A check valve 66 permitting a fluid flow only in a direction from the pressure adjusting fluid pressure passage 62 to the third fluid pressure passage 42 is provided, in parallel, between the third fluid pressure passage 42 and the pressure adjusting fluid pressure passage 62.

The SA-2 48 is a two-position solenoid valve which selectively renders one of the first fluid pressure passage 36 and the pressure adjusting fluid pressure passage 62 to communicate with the wheel cylinder 44FL, and renders the first fluid pressure passage 36 and the wheel cylinder 44FL to be in a communicating state in a normal state (OFF state). On the other hand, the SFLR 64 is a two-position solenoid valve which renders the pressure adjusting fluid pressure passage 62 and the reservoir tank 16 to be in a connected state or a disconnected state. The SFLR 64 renders the pressure adjusting fluid pressure passage 62 and the reservoir tank 16 to be in a disconnected state from each other in a normal state (OFF state).

The second fluid pressure passage 38 communicates with the above-mentioned SA-3 54. The downstream side of the SA-3 54 communicates with a right rear wheel holding solenoid valve 68 (hereinafter, referred to as SRRH 68) provided in correspondence with a wheel cylinder 44RR of the right rear wheel RR and a left rear wheel holding solenoid valve 70 (hereinafter, referred to as SRLR 70) provided in correspondence with a wheel cylinder 44RL of the left rear wheel RL. The SA-3 54 is a two-position solenoid valve which selectively selectively renders one of the second fluid pressure passage 38 and the third fluid pressure passage 42 to communicate with the SRRH 68 and the SRLR 70, and renders the second fluid pressure passage 38, the SRRH 68 and the SRLR 70 in a communicating state in a normal state (OFF state).

The downstream side of the SRRH 68 communicates with the wheel cylinder 44RR and a right rear wheel pressure decreasing solenoid valve 74 (hereinafter, referred to as SRRR 74) via a pressure adjusting fluid pressure passage 72. The SRRR 74 is a two-position solenoid valve which renders the pressure adjusting fluid pressure passage 72 and the reservoir tank 16 in a communicating state or a disconnected state, and renders the pressure adjusting fluid pressure passage 72 and the reservoir tank 16 in the disconnected state in a normal state (OFF state). Additionally, a check valve 76 permitting a fluid flow only in a direction from the pressure adjusting fluid pressure passage 72 to the SA-3 54 is provided, in parallel, between the SA-3 54 and the pressure adjusting fluid pressure passage 72.

Similarly, the downstream side of the SRLH 70 communicates with the wheel cylinder 44RL and a left rear wheel pressure decreasing solenoid valve 80 (hereinafter, referred to as SRLR 80) via a pressure adjusting fluid pressure passage 78. The SRLR 80 is a two-position solenoid valve which renders the pressure adjusting fluid pressure passage 78 and the reservoir tank 16 in a communicating state or a disconnected state, and renders the pressure adjusting fluid pressure passage 78 and the reservoir tank 16 in the disconnected state in a normal state (OFF state). Additionally, a check valve 82 permitting a fluid flow only in a direction from the pressure adjusting fluid pressure passage 78 to the SA-3 54 is provided, in parallel, between the SA-3 54 and the pressure adjusting fluid pressure passage 78.

In the system according to the present embodiment, a brake switch 84 is provided near the brake pedal 30. The brake switch 84 is a switch that generates an ON output when the brake pedal 30 is pressed. The output signal of the brake switch 84 is supplied to the ECU 10. The ECU 10 determines whether or not a braking operation is performed by the driver based on the output signal of the brake switch 84.

Additionally, in the system according to the present embodiment, wheel speed sensors 86FL, 86FR, 86RL and 86RR (hereinafter, these are referred to as 86 as a whole) are provided near the left and right front wheels FL and FR and the left and right rear wheels RL and RR, each of the sensors generating a pulse signal when the respective wheel rotates a predetermined angle. The output signals of the wheel speed sensors 86** are supplied to the ECU 10. The ECU 10 detects a wheel speed of each of the wheels FL, FR, RL and RR based on the output signals of the wheel speed sensors 86****.

The ECU 10 supplies, if necessary, drive signals to the above-mentioned STR 26, SA-1 46, SA-2 48, SA-3 54, SFRH 50, SFLH 52, SFRR 58, SFLR 64, SRRH 68, SRLH 70, SRRR 74 and SRLR 80 based on the output signal of the brake switch 84.

A description will now be given of an operation of the brake force control apparatus according to the present embodiment. The brake force control apparatus according to the present embodiment performs the normal control for generating a brake force corresponding to the brake pressing force Fp exerted on the brake pedal 30 when the vehicle is in a stable state. The normal control can be achieved, as shown in FIG. 1, by turning off all of the STR 26, SA-1 46, SA-2 48, SA-3 54, SFRH 50, SFLH 52, SFRR 58, SFLR 64, SRRH 68, SRLH 70, SRRR 74 and SRLR 80 based on the output signal of the brake switch 84.

That is, in the state shown in FIG. 1, the wheel cylinders 44FR and 44FL communicate with the first fluid pressure passage 36, and the wheel cylinders 44RR and 44RL communicate with the second fluid pressure passage 38. In this case, the brake fluid flows between the master cylinder 32 and the wheel cylinders 44FR, 44FL, 44RL and 44RR (hereinafter, these may be referred to as 44** as a whole), and a brake force corresponding to the brake pressing force Fp is generated in each of the wheels FL, FR, RL and RR.

In the present embodiment, when a possibility for shifting to a locked state is detected in one of the wheels, it is determined that a condition for performing an antilock brake control (hereinafter, referred to as ABS control) is established. The ECU 10 calculates wheel speeds V$_{WFL}$, V$_{WFR}$, V$_{WRL}$ and V$_{WRR}$ (hereinafter, these are referred to as Vw as a whole) of the wheels based on output signals of the wheel speed sensors 86****, and calculates an assumed value Vso (hereinafter, referred to as an assumed vehicle speed Vso) of a speed of the vehicle according to a publicly known method. Then, when the vehicle is in a braking state, a slip rate S of each wheel is calculated according to the following equation so as to determine that the wheel may shift to a locked state when the slip rate S exceeds a predetermined value.

$$S = (V_{SO} - V_W**) \cdot 100 / V_{SO} \qquad (1)$$

When the condition for performing the ABS control is established, the ECU 10 outputs the drive signals to the SA-1 46, SA-2 48 and SA-3 54. As a result, when the SA-1 46 is turned on, the wheel cylinder 44FR is disconnected from the first fluid pressure passage 36 and connected to the pressure adjusting fluid pressure passage 56. Additionally, when the SA-2 48 is turned on, the wheel cylinder 44FL is disconnected from the first fluid pressure passage 36 and connected to the pressure adjusting fluid pressure passage 62. Further, when the SA-3 54 is turned on, the upstream side of the SRRH 68 and the SRLH 70 is disconnected from the second fluid pressure passage 38 and connected to the third fluid pressure passage 42.

In this case, all wheel cylinders 44 communicating with respective holding solenoid valves SFRH 50, SFLH 52, SRRH 68 and SRLH 70 (hereinafter, these are referred to as holding solenoid SH) and respective pressure decreasing solenoid valves SFRR 58, SFLR 64, SRRR 74 and SRLR 80 (hereinafter, these are referred to as pressure decreasing solenoid SR), and a regulator pressure P$_{RE}$ is introduced to the upstream side of each of the holding solenoids SH via the third fluid pressure passage 42 and the STR 26.

In the above-mentioned condition, a wheel cylinder pressure P$_{W/C}$ of the respective wheel cylinders 44 is increased with the regulator pressure P$_{RE}$ as an upper limit by the holding solenoids SH being in an open state and the pressure decreasing solenoids SR being in a closed state. Hereinafter, this state is referred to as a pressure-increasing mode ①. Additionally, the wheel cylinder pressure P$_{W/C}$ of the respective wheel cylinders 44** is maintained without being increased or decreased by the holding solenoids SH being in a closed state and the pressure decreasing solenoids SR being in the closed state. Hereinafter, this state is referred to as a holding mode ②. Further, the wheel cylinder pressure P$_{W/C}$ of the respective wheel cylinders 44** is decreased by the holding solenoids SH being in the closed state and the pressure decreasing solenoids SR being in the open state. Hereinafter, this state is referred to as a pressure-decreasing mode ③. The ECU 10** achieves, if necessary, the above-mentioned pressure-increasing mode ①, holding mode ② and pressure-decreasing mode ③ so that a slip rate S of each wheel in a braking time becomes an appropriate value, that is, so that each wheel does not shift to the locked state.

When a depression of the brake pedal 30 is released by the driver during execution of the ABS control, the wheel cylinder pressure P$_{W/C}$ must be immediately decreased. In the system according to the present embodiment, the check valves 60, 66, 76 and 82 are provided in hydraulic pressure paths corresponding to each of the wheel cylinders 44, each of the check valves 60, 66, 76 and 82 permitting a fluid flow only in the directions from the wheel cylinders 44** to the third fluid pressure passage 42. Thus, according to the system of the present embodiment, the wheel cylinder pressures P$_{W/C}$ of all of the wheel cylinders 44** can be immediately decreased after the depression of the brake pedal 30** is released.

In the system according to the present embodiment, when the ABS control is performed, the wheel cylinder pressure P$_{W/C}$ is increased by the brake fluid being supplied from the regulator 24 to the wheel cylinders 44, that is, by the brake fluid being supplied from the pump 12 to the wheel cylinders 44**, and is decreased by the brake fluid in the wheel cylinders 44** flowing to the reservoir tank 16. When the increase in the wheel cylinder pressure P$_{W/C}$ is performed by using the master cylinder 32 as a fluid pressure source and if the pressure-increasing mode and the pressure-decreasing mode are repeatedly performed, the brake fluid in the master cylinder 32** gradually decreases and a so-called bottoming of the master cylinder may occur.

On the other hand, if the pump 12 is used as a fluid pressure source so as to increase the wheel cylinder pressure P$_{W/C}$, as in the system according to the present embodiment, such a bottoming can be prevented. Thus, in the system according to the present embodiment, a stable operational state can be maintained if the ABS control is continued for a long time.

In the system according to the present embodiment, the ABS control is started when a possibility for shifting to the locked state is detected in one of the wheels. Accordingly, in order to start the ABS control, as a precondition, a braking operation having a level at which a large slip rate S is generated in one of the wheels must be performed.

Figure 2:
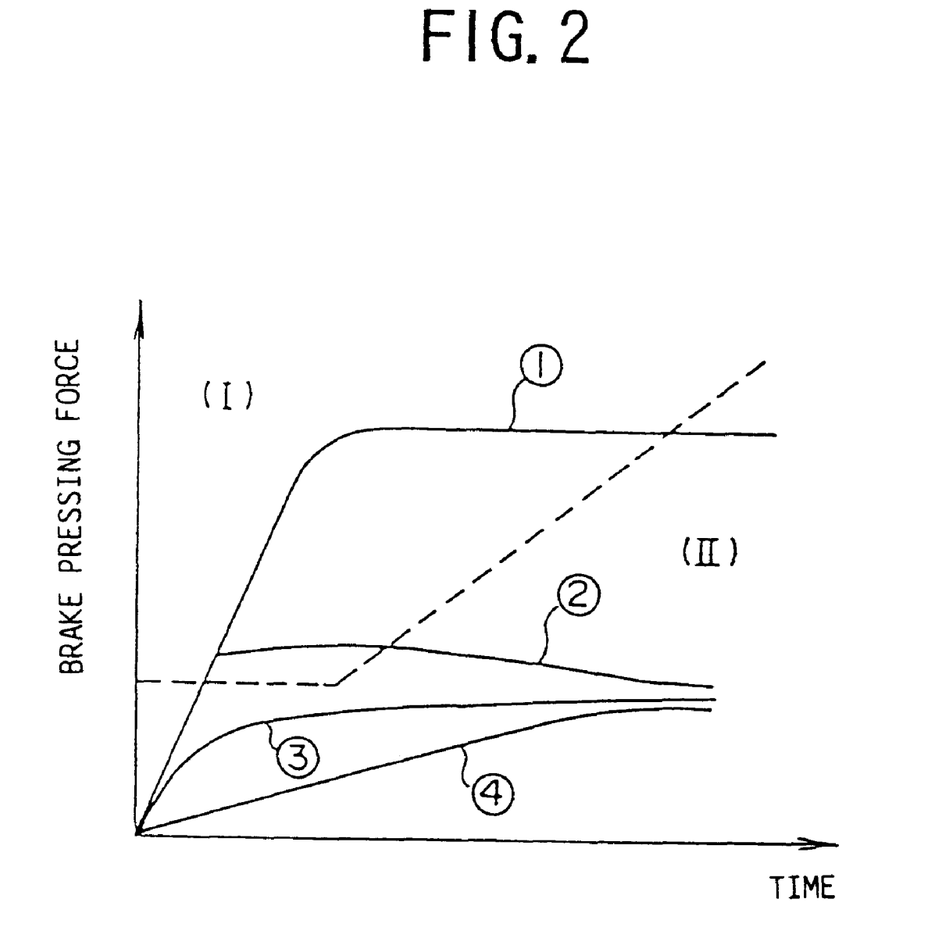
FIG. 2 is an illustration for showing a change in a brake pressing force achieved under various circumstances.

FIG. 2 shows changes in the brake pressing force F$_P$ applied to the brake pedal 30 with respect to time under various conditions. Curves indicated by ① and ② in FIG. 2 represent changes in the pressing force F$_P$ when an emergency braking is performed by a highly skilled driver (hereinafter, referred to as a high-grade class driver) and an unskilled driver or a driver lacking strength (hereinafter, referred to as a beginner-grade driver), respectively. The emergency braking operation is an operation performed when is it desired to rapidly decelerate a vehicle. Accordingly, the brake pressing force associated with the emergency braking operation is preferably a force sufficiently large as the ABS control is performed.

As shown by the curve ①, when the driver of the vehicle is a high-grade driver, the brake pressing force F$_P$ is immediately and rapidly increased in response to establishment of a condition in which an emergency braking is required, and a large brake pressing force F$_P$ can be maintained for a long time. If such a brake pressing force F$_P$ is exerted on the brake pedal 30, a sufficiently high brake fluid pressure can be provided from the master cylinder 32 to each of the wheel cylinders 44** so as to start the ABS control.

However, as shown by the curve ② when the driver of the vehicle is a beginner-grade driver, the brake pressing force F$_P$ may not be increased to a sufficiently high value in response to establishment of the condition in which an emergency braking is required. If the brake pressing force F$_P$ exerted on the brake pedal 30 is not sufficiently increased as shown by the curve ② after an emergency braking is required, the wheel cylinder pressure P$_{W/C}$ in each of the wheels 44** is not sufficiently increased, which results in a possibility that the ABS control is not started.

As mentioned above, when the driver of the vehicle is a beginner-grade driver, the braking ability of the vehicle may not be sufficiently performed even when an emergency braking operation is performed despite that the vehicle has a good braking ability. Accordingly, the system according to the present embodiment is provided with a brake assist function for sufficiently increasing the wheel cylinder pressure P$_{W/C}$ even if the brake pressing force F$_P$ is not sufficiently increased when the brake pedal is operated with an intention to perform an emergency braking. Hereinafter, a control performed by the ECU 10 to achieve such a function is referred to as a brake assist control.

In the system according to the present embodiment, when performing the brake assist control, an accurate determination must be made as to whether, when the brake pedal 30 is operated, the operation is intended to perform an emergency braking operation or to perform a regular braking operation.

Curves indicated by shown ③ and ④ in FIG. 2 show changes in the brake pressing force F$_P$ when the driver operates the brake pedal with an intention to perform a normal braking operation under various conditions. As shown by the curves ① to ④, a change in the brake pressing force F$_P$ associated with the normal braking operation is gentle as compared to a change in the brake pressing force F$_P$ associated with an emergency braking operation. Additionally, a convergent value of the brake pressing force F$_P$ associated with the normal braking operation is not so large as a convergent value of the brake pressing force F$_P$ associated with an emergency braking operation.

Giving attention to those differences, when the brake pressing force $F_P$ is increased to a sufficiently large value at a rate of change exceeding a predetermined value after a braking operation is started, that is, when the brake pedal 30 is operated so that the brake pressing force $F_P$ reaches an area indicated by (I) in FIG. 2, it can be determined that an emergency braking is performed.

Additionally, when the rate of change of the brake pressing force $F_P$ is smaller than the predetermined value or when the convergent value of the brake pressing force $F_P$ is smaller than the predetermined value, that is, when the brake pedal 30 is operated so that the brake pressing force $F_P$ always changes within an area indicated by (II) in FIG. 2, it can be determined that a normal braking operation is performed.

Accordingly, in the system according to the present embodiment, an operational speed and an amount of operation of the brake pedal are detected or assumed, and, then, it is determined whether or not the operational speed exceeds a predetermined value and whether or not the amount of operation exceeds a predetermined value, and, thereby, it can be determined whether or not the operation on the brake pedal 30 is intended to perform an emergency braking.

In the brake force control apparatus according to the present embodiment, the brake pedal 30 is moved by an increase or decrease in the brake pressing force $F_P$. At this time, a larger operational speed is generated in the brake pedal 30 as the brake pressing force shows a steep slope, and an amount of operation substantially corresponding to the brake pressing force $F_P$ is generated. Accordingly, the operational speed and the amount of operation of the brake pedal 30 can be accurately assumed from the brake pressing force $F_P$.

A description will now be given of an operation of the present embodiment when an execution of an emergency braking operation is determined by the ECU 10. The ECU 10 determines that an emergency braking is performed when the master cylinder pressure $P_{M/C}$ exceeding the predetermined value is detected and a rate of change $\Delta P_{M/C}$ is detected after the brake pedal 30 is pressed. When it is determined that an emergency braking is performed, the ECU 10 outputs the drive signals to the STR 26, the SA-1 46, the SA-2 48 and the SA-3 54.

When the STR 26 is turned on upon receipt of the above-mentioned drive signal, the third fluid pressure passage 42 and the high-pressure passage 22 are directly connected to each other. In this case, an accumulator pressure $P_{ACC}$ is introduced into the third fluid pressure passage 42. Additionally, when the SA-1 46 and the SA-2 48 are turned on upon receipt of the drive signals, the wheel cylinders 44FR and 44FL communicate with the pressure adjusting fluid pressure passages 56 and 62, respectively. Further, when the SA-3 54 is turned on upon receipt of the above-mentioned drive signal, the upstream side of the SRRH 68 communicates with the third fluid pressure passage 42. In this case, a state is established in which all of the wheel cylinders 44 communicate with the respective holding solenoids SH and the respective pressure decreasing solenoids SR and the accumulator pressure $P_{ACC}$ is introduced to the upstream side of each of the holding solenoids SH.

In the ECU 10, all of the holding solenoids SH and all of the pressure decreasing solenoids SR are maintained in the OFF state immediately after execution of an emergency braking is detected. Accordingly, as mentioned above, when the accumulator pressure $P_{ACC}$ is introduced to the upstream side of the holding solenoids SH, the fluid pressure is provided to the wheel cylinders 44 without being changed. As a result, the wheel cylinder pressure $P_{W/C}$ of all of the wheel cylinders 44** is increased toward the accumulator pressure $P_{ACC}$.

As mentioned above, according to the system of the present embodiment, when an emergency braking is performed, the wheel cylinder pressure $P_{W/C}$ of all of the wheel cylinders 44** can be immediately increased irrespective of a magnitude of the brake pressing force $F_P$. Thus, according to the system of the present embodiment, a large brake force can be generated immediately after establishment of a condition in which an emergency braking is required, even if the driver is a beginner-grade driver.

When the accumulator pressure $P_{ACC}$ begins to be supplied to the wheel cylinders 44**, as mentioned above, a slip rate S of each of the wheels FL, FR, RL and RR is rapidly increased, and the condition for performing the ABS control is finally established. When the condition for performing the ABS control is established, the ECU 10 achieves, if necessary, the above-mentioned pressure-increasing mode ①, holding mode ② and pressure-decreasing mode ③ so that the slip rate S of each of the wheels becomes an appropriate value, that is, so that each of the wheels does not shift to the locked state.

It should be noted that when the ABS control is performed subsequent to an emergency braking operation, the wheel cylinder pressure $P_{W/C}$ is increased by using the pump 12 and the accumulator 20 as a fluid pressure source, and is decreased by the brake fluid in the wheel cylinders 44** flowing to the reservoir tank 16. Accordingly, if the pressure-increasing mode and the pressure-decreasing mode are repeated, a so-called bottoming of the master cylinder 32 does not occur.

When the brake assist control is started as mentioned above by execution of an emergency braking operation, the brake assist control must be ended when a press of the brake pedal 30 is released. In the system according to the present invention, as mentioned above, the STR 26, the SA-1 46, the SA-2 48 and the SA-3 54 are maintained to be in the ON state. When the STR 26, the SA-1 46, the SA-2 48 and the SA-3 54 are in the ON state, each of the fluid pressure chamber in the regulator 24 and the first fluid pressure chamber 32a and the second fluid pressure chamber 32b becomes substantially a closed space.

In the above-mentioned condition, the master cylinder pressure $P_{M/C}$ becomes a value corresponding to the brake pressing force $F_P$. Accordingly, the ECU can easily determine whether or not the depression of the brake pedal is released by monitoring an output signal of the master cylinder pressure $P_{M/C}$ detected by the hydraulic pressure sensor 40. When the release of the depression of the brake pedal 30 is detected, the ECU 10 stops the supply of the drive signals to the STR 26, the SA-1 46, the SA-2 48 and the SA-3 54 so as to achieve a state of execution of the normal control.

As mentioned above, the brake force control apparatus according to the present invention determines that an emergency braking is performed when the master cylinder pressure $P_{M/C}$ exceeding the predetermined value is detected and the rate of change $\Delta P_{M/C}$ exceeding the predetermined value is detected. Among these parameters, the rate of change $\Delta P_{M/C}$ becomes a value grater than that of a normal time in a case in which the vehicle is moving a rough road while the drive's foot is placed on the brake pedal 30 and a case in which the vehicle overrides a step while the driver's foot is placed on the brake pedal 30.

That is, the rate of change $\Delta P_{M/C}$ may become temporarily a large value while the vehicle is moving on a rough road or the vehicle is passing a step even when the driver does not intend to perform an emergency operation. Accordingly, if a determination as to whether or not an emergency braking operation is performed is made based on only the determination as to whether or not the master cylinder pressure $P_{M/C}$ exceeding the predetermined value is generated and whether or not the rate of change $\Delta P_{M/C}$ exceeding the predetermined value, a condition may occur in which an emergency braking operation is erroneously detected regardless of the emergency braking operation being not performed during a movement of a rough road or a passage of a step.

Figure 3A:
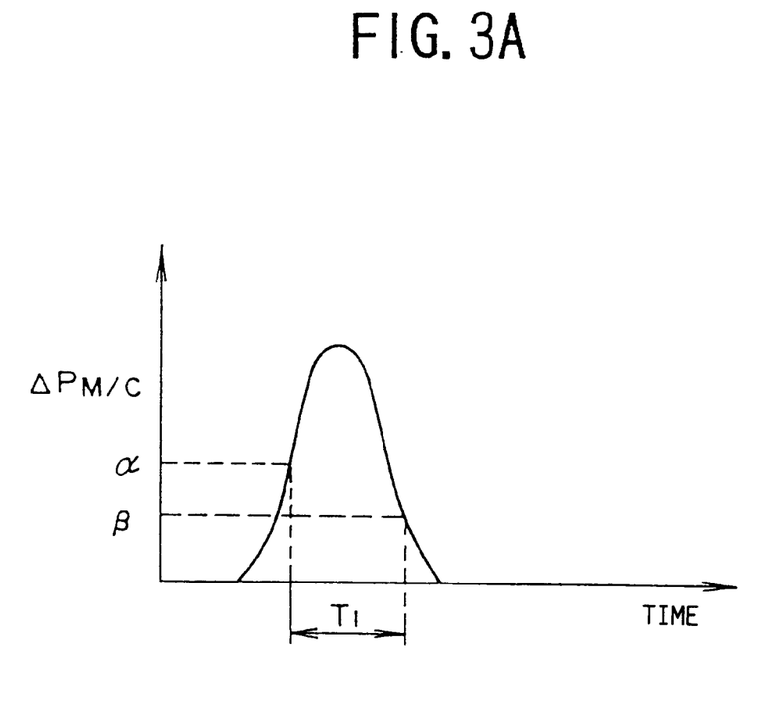
FIG. 3A is an illustration of a change appearing in a rate of change $\Delta P_{M/C}$ of a master cylinder pressure $P_{M/C}$ when a driver performs a braking operation with an intention to perform an emergency operation.
Figure 3B:
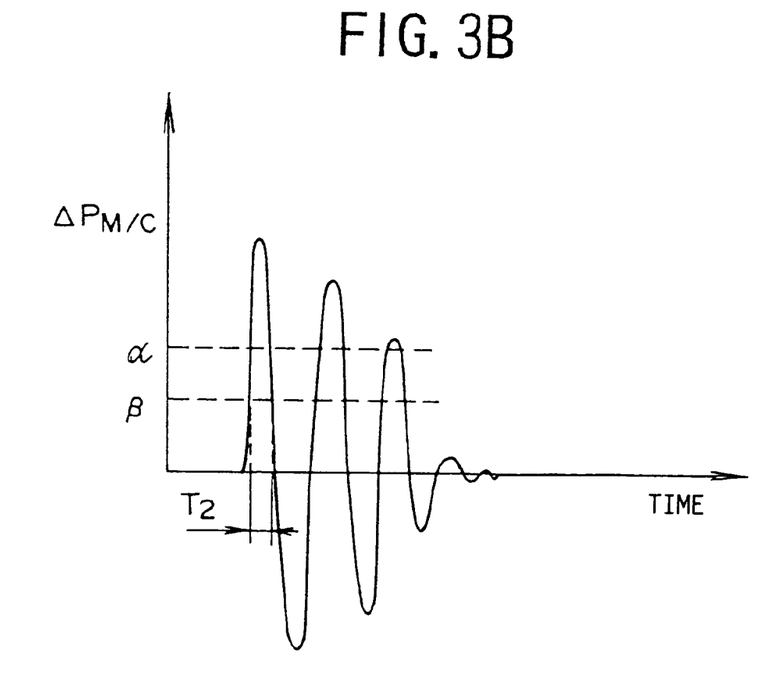
FIG. 3B is an illustration of a change appearing in a rate of change $\Delta P_{M/C}$ of a master cylinder pressure $P_{M/C}$ when a driver performs a braking operation with an intention to perform an emergency operation.

FIG. 3A chows a change appearing in the rate of change $\Delta P_{M/C}$ when the driver presses the brake pedal 30 with an intention to perform an emergency braking operation. On the other hand, FIG. 3B shows a change appearing in the rate of change $\Delta P_{M/C}$ when the brake pedal 30 is pressed due to a vibration of a vehicle during a movement on a rough road. As shown in FIG. 3A and FIG. 3B, when the brake pedal 30 is pressed due to an external disturbance such as a vibration of the vehicle, the rate of change $\Delta P_{M/C}$ varies at a frequency higher than that of a case in which the driver presses the brake pedal 30 with an intention to perform en emergency braking.

Accordingly, if a large change occurs in the rate of change $\Delta P_{M/C}$, the determination can be accurately made as to whether the change is intended by the driver or due to an external disturbance such as a rough road. More specifically, for example, for example, an accurate determination can be made as to whether or not the change appearing in the rate of change $\Delta P_{M/C}$ is intended by the driver by counting the time (a time $T_1$ shown in FIG. 3A and a time $T_2$ shown in FIG. 3B) necessary for the rate of change $\Delta P_{M/C}$ to reach a value less than a second threshold value $\beta$ after a change exceeding a first threshold value $\alpha$ appears in the rate of change $\Delta P_{M/C}$ and comparing the counted time with a predetermined time $T_0$.

The brake force control apparatus according to the present embodiment has a feature that when a change is generated in the rate of change $\Delta P_{M/C}$, a cause of the change is assumed by the above-mentioned method, and further a determination is performed as to whether or not the brake assist control should be performed based on the result of assumption. A description will be given below, with reference to FIG. 4, of a feature of the present embodiment.

Figure 4:
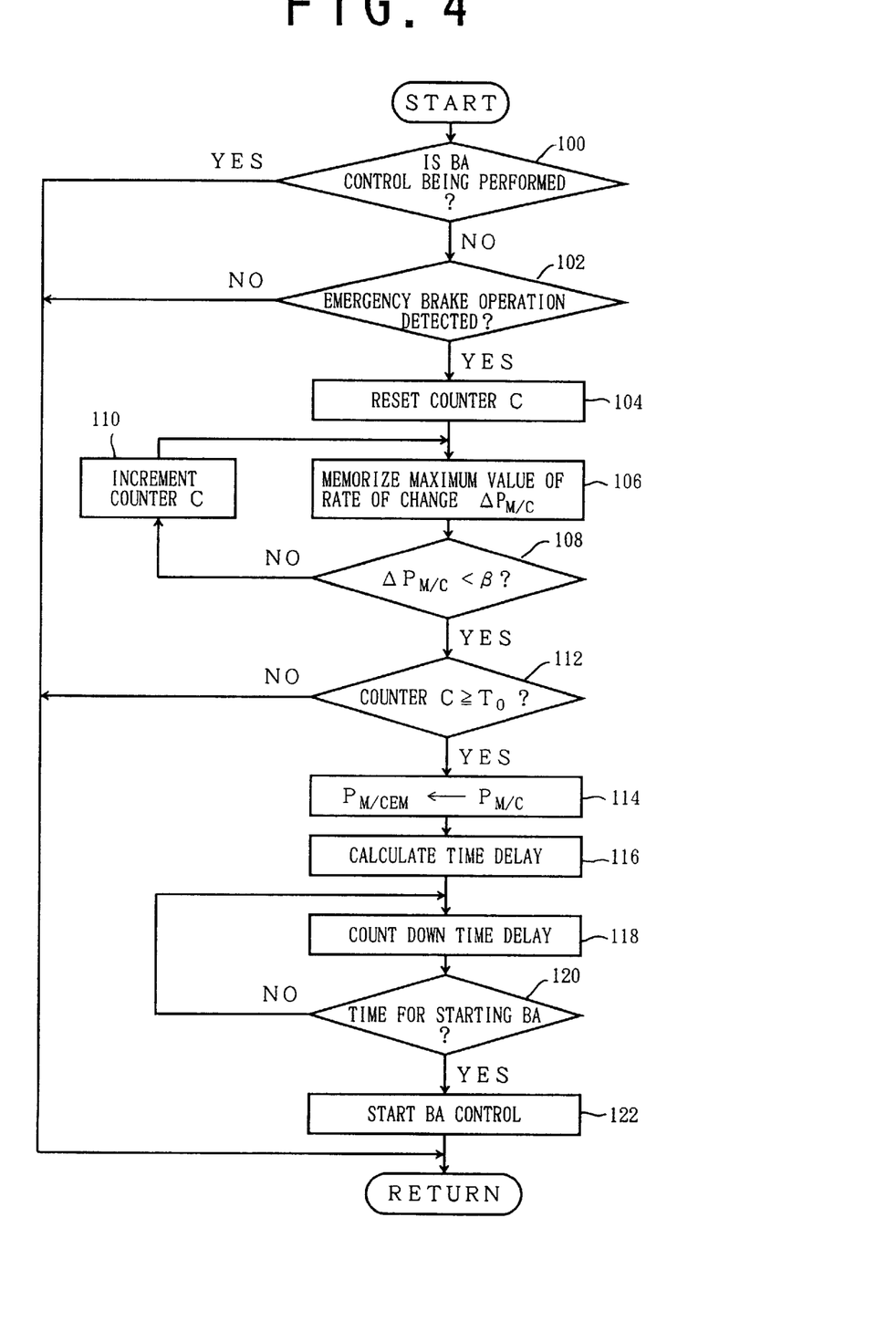
FIG. 4 is a flowchart of an example of a control routine performed in the brake force control apparatus shown in FIG. 1.

FIG. 4 is a flowchart of an example of a control routine performed by the ECU 10 so as to achieve the above-mentioned function. The routine shown in FIG. 4 is a periodic interruption routine started at every predetermined time. When the routine shown in FIG. 4 is started, the process of step 100 is performed first.

In step 100, if it determined whether or not the brake assist control is being performed. This routine is for determining whether or not the brake assist control should be performed. Accordingly, if it is determined that the brake assist control has already been started, the routine at this time is ended without performing any process thereafter. On the other hand, if it is determined by the above-mentioned determination that the brake assist control is not being performed, the process of step 102 is performed subsequently.

In step 102, it is determined whether or not an execution of an emergency braking operation is detected. Specifically, it is determined whether or not both "$P_{M/C} > P_0$" and "$P_{M/C} > \alpha$" are established after an ON output is sent from the brake switch 84. In the above-mentioned equations, "$P_0$" is a threshold value set to the master cylinder pressure $P_{M/C}$ for determining whether or not an emergency braking operation is being performed. On the other hand, "$\alpha$" in the above-mentioned equations is a first threshold value set to the rate of change for determining whether or not an emergency braking operation is being performed.

If it is determined, in the above-mentioned step 102, that an emergency braking operation is not being performed, the routine at this time is ended without performing any process. On the other hand, if it is determined that an emergency braking operation is being performed, the process of step 104 is performed thereafter.

In step 104, a counter C is reset. The counter C is a counter for counting a passed time after the rate of change exceeds the first threshold value $\alpha$ and until the rate of change $\Delta P_{M/C}$ becomes a value less than the second threshold value $\beta$. After the above-mentioned process is completed, the process of step 106 is performed.

In step 106, a process for memorizing a maximum value $MAX\Delta P_{M/C}$ of the rate of change $\Delta P_{M/C}$ generated in the master cylinder pressure $P_{M/C}$ is performed. Specifically, a process for memorizing a current maximum value $MAX\Delta P_{M/C}$ as a new maximum value $MAX\Delta P_{M/C}$ when the rate of change $\Delta P_{M/C}$ detected at the present process is greater than a value which was memorized as the maximum value $MAX\Delta P_{M/C}$ at a previous process is performed. As a result, if it is determined that $\Delta P_{M/C} < \beta$ is not yet established, the process of step 112 is performed subsequently.

In step 112, it is determined whether or not the count value of the counter C is greater than the predetermined time $T_0$. The predetermined time $T_0$ is a time sufficiently shorter than that detected when the driver performs a braking operation with an intention to perform an emergency braking operation.

Accordingly, as a result of the above-mentioned determination, if it is determined that $C \geq T_1$ is not established, it can be determined that the cause of the detected emergency braking operation is an external disturbance such as a rough road or a step. In this case, the routine at this time is ended without performing any Process. On the other hand, if it is determined that $C \geq T_1$ is established, it can be determined that the cause of the detected emergency braking operation is an emergency braking operation performed by the driver. In this case, the process of step 114 is performed subsequently so as to start the brake assist control.

According to the above-mentioned process, an execution of the brake assist control can be prohibited when the master cylinder pressure $P_{M/C}$ or the rate of change $\Delta P_{M/C}$ is assumed to be caused by an external disturbance such as a rough road or a step even when the master cylinder pressure $P_{M/C}$ and the rate of change $\Delta P_{M/C}$ satisfy a condition for executing the brake assist control. Thus, according to the brake force control apparatus of the present embodiment, the brake assist control is prevented from being unnecessarily performed when a vehicle moves on a rough road or passes a step.

In the present routine, the condition of step 112 is determined immediately after the above-mentioned condition of step 108 is established. Additionally, the condition of step 108 is established at a stage in which the master cylinder pressure $P_{M/C}$ begins to be converged with an appropriate fluid pressure corresponding to a brake pressing force after the master cylinder pressure $P_{M/C}$ was rapidly increased.

When the master cylinder pressure $P_{M/C}$ is rapidly increased, a pressure difference is generated between the master cylinder pressure $P_{M/C}$ and the wheel cylinder pressure $P_{W/C}$. Accordingly, at a time when the condition of step 112 is established, a pressure difference is generated in the master cylinder pressure $P_{M/C}$ and the wheel cylinder pressure $P_{W/C}$. Hereinafter, this pressure difference is referred to as an emergency braking time pressure difference $\Delta P_{EM}$.

When a large pressure difference is generated in the master cylinder pressure $P_{M/C}$ and the wheel cylinder pressure $P_{W/C}$, the wheel cylinder pressure $P_{W/C}$ can be increased faster by using the master cylinder as fluid pressure source than using the pump 12 and the accumulator 20 as a fluid pressure source. Accordingly, it is preferable that the brake assist control is not started during a period after the condition of step 112 is established and until the pressure difference between the master cylinder pressure $P_{M/C}$ and the wheel cylinder pressure $P_{W/C}$ is reduced to a certain small value.

After the condition of step 112 is established, the period (hereinafter, referred to as a time delay D) during which the brake assist control should not be started should be longer as the emergency braking time pressure difference $\Delta P_{EM}$ is larger. The emergency braking time pressure difference $\Delta P_{EM}$ is larger as the maximum value $MAX\Delta P_{M/C}$ of the rate of change $\Delta P_{M/C}$ is larger and as the master cylinder pressure $\Delta P_{M/C}$ (hereinafter, referred to as an emergency braking time master pressure $P_{M/CEM}$) at a time when the condition of step 112 is higher. Accordingly, it is appropriated to set the time delay D to a longer time as the maximum value $MAX\Delta P_{M/C}$ is larger or as the emergency braking time master pressure $\Delta P_{M/CEM}$ is higher.

In step 114 of the present routine, master cylinder pressure $P_{M/C}$ currently detected by the hydraulic pressure sensor 40 is memorized as the emergency braking time master pressure $P_{M/CEM}$. After the process of step 114 is completed, the process of step 116 is performed.

In step 116, the time delay D is calculated based on the emergency braking time master pressure $\Delta P_{M/CEM}$ and the maximum value $MAX\Delta P_{M/C}$. The time delay D is set to a longer time as the emergency braking time master pressure $P_{M/CEM}$ is higher or the maximum value $MAX\Delta P_{M/C}$ is larger based on a map previously stored in the ECU 10. After the process of step 116 is completed, the process of step 118 is performed subsequently.

In step 118, the time delay D is counted down. After the process of step 118 is completed, the process of step 120 is performed.

In step 120, it is determined whether or not a time for starting the brake assist control is reached. In step 120, it is determined that the time for starting the brake assist control is reached when the counting operation of the time delay D is completed. If it is determined that the time for starting has not been reached yet, the process of step 118 is repeated. On the other hand, if it is determined that the time for starting has been reached, the process of step 122 is performed.

In step 122, a process for starting the brake assist control is performed. After the process of step 122 is completed, the routine at this time is ended. According to the above-mentioned process, a large wheel cylinder pressure $P_{W/C}$ can be generated in each wheel immediately after an emergency braking operation is performed by the driver.

As mentioned above, according to the brake force control apparatus of the present embodiment, even if the brake pedal 30 is operated at a high speed, an execution of the brake assist control can be prohibited when the cause of the operation is an external disturbance such as a rough road or a step. Additionally, if the brake pedal is operated at a high speed due to an emergency braking operation by the driver, the wheel cylinder pressure $P_{W/C}$ can be rapidly and efficiently increased by starting the brake assist control after waited for passage of the time delay D.

As mentioned above, according to the brake force control apparatus of the present embodiment, the determination as to whether a braking operation performed by the driver is an emergency braking operation or a normal braking operation is made based on the master cylinder pressure $P_{M/C}$ and the rate of change $\Delta P_{M/C}$ thereof. Additionally, the determination as to whether or not the braking operation is intended by the driver or due to an external disturbance is made based on the rate of change $\Delta P_{M/C}$. However, the parameters that are the base for these determinations is not limited to the master cylinder pressure $P_{M/C}$ and the rate of change $\Delta P_{M/C}$ thereof.

That is, when the brake pedal 30 is operated, a change is generated in the brake pressing force $F_P$ and the amount of stroke L of the brake pedal as well as the master cylinder pressure $P_{M/C}$. Additionally, when the brake pedal 30 is operated and, as a result, a brake force is exerted on the vehicle, a deceleration G is generated in the vehicle. Accordingly, the discrimination of the an emergency braking operation and a normal braking operation and a determination of a cause of the braking operation can be performed based on ② the brake pressing force $F_P$, ③ the pedal stroke L, ④ the vehicle deceleration G, ⑤ the assumed vehicle speed $V_{SO}$ and ⑥ the wheel speed $V_W^{**}$ in addition to ① the master cylinder pressure $P_{M/C}$.

A description will now be given, with reference to FIG. 5, of a second embodiment of the present invention. The brake force control apparatus according to the present embodiment can be achieved by causing the ECU 10 to perform a control routine shown in FIG. 5 instead of the control routine shown in FIG. 4 in the system structure shown in FIG. 1.

Figure 5:
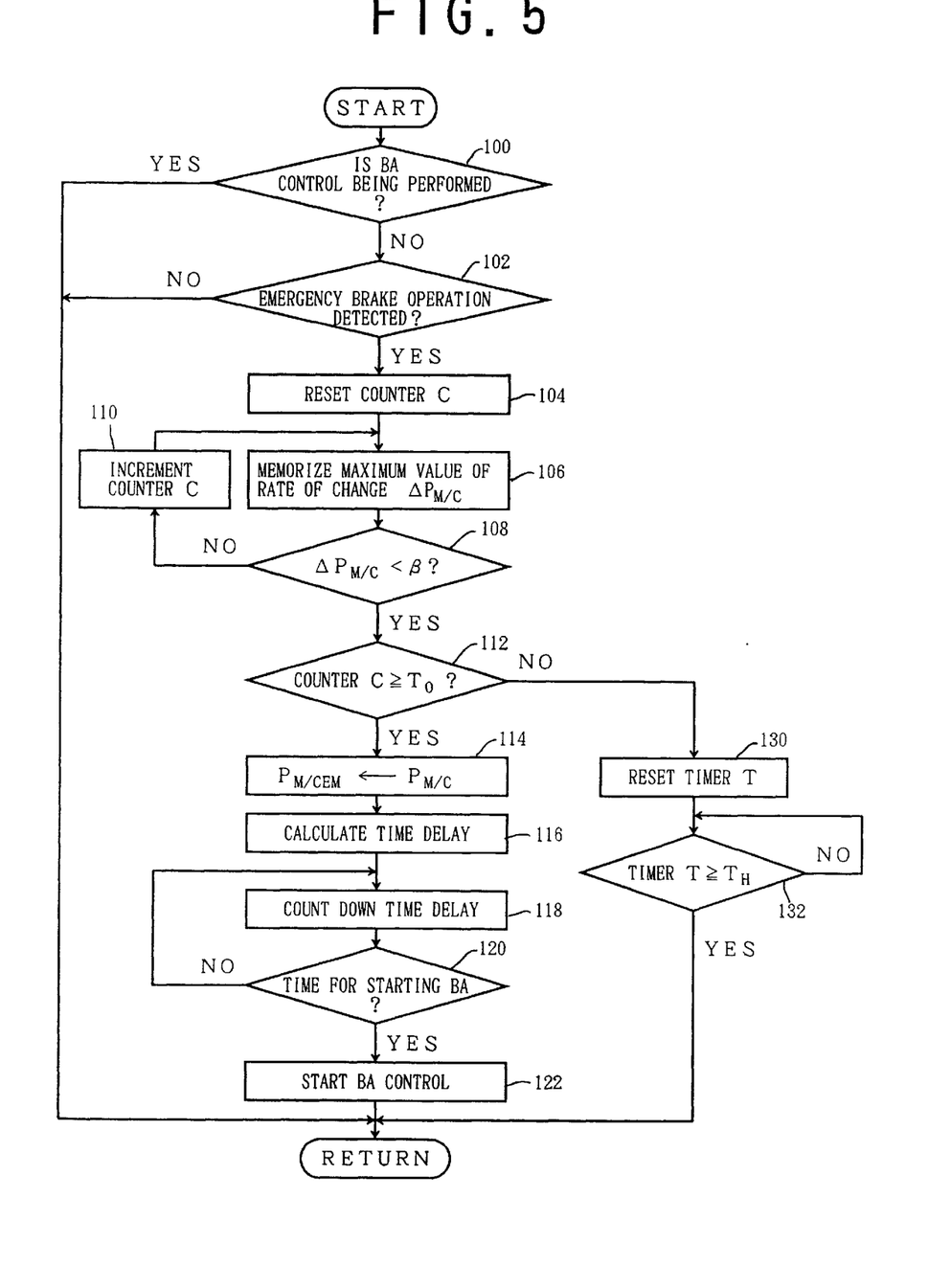
FIG. 5 is a flowchart of an example of a control routine performed in a brake force control apparatus which is a second embodiment of the present invention.

FIG. 5 is a flowchart of an example of a control routine performed by the ECU 10 so as to eliminate an influence of an external disturbance such as a rough road or a step. It should be noted that, in the routine shown in FIG. 5, steps that perform the processes the same as the processes of the routine shown in FIG. 4 are given the same reference numerals, and descriptions thereof will be omitted.

In the routine shown in FIG. 5, if it is determined, in step 112, that the counter C is not greater than the predetermined time $T_0$, that is, if it is determined that the detected braking operation is caused by an external disturbance, the process of step 130 is performed subsequently.

In step 130, a timer T is reset. The timer T is a timer which counts a passed time after a braking operation caused by an external disturbance is detected. The timer T is incremented irrespective of an execution of the present routine. After the timer T is reset, the process of step 132 is performed.

In step 132, it is determined whether or not the count time of the timer T is equal to or greater than a predetermined time $T_H$. As a result, if it is determined that the timer $T \geq T_H$ is not established, the process of the present step is repeated. Then, if it is determined that the timer $T \geq T_H$ is established, the routine at this time is ended.

As shown in FIG. 3B, when the brake pedal 30 is operated due to an external disturbance such as a rough road or a step, the rate of change $\Delta P_{M/C}$ attenuates with respect to passage of time. The predetermined time $T_H$ is set to a value necessary for the rate of change $\Delta P_{M/C}$ attenuating under such a condition. Accordingly, if the timer $T \geq T_H$ is not established, it can be determined that a vibration is still generated in the rate of change $\Delta P_{M/C}$. On the other hand, if the timer $T \geq T_H$ is established, it can be determined that a vibration of the rate of change $\Delta P_{M/C}$ is attenuated.

According to the above-mentioned process, the determination (the process of step 102) as to whether or not an emergency braking operation is being performed is not performed again at least during the predetermined time $T_H$ after a braking operation caused by an external disturbance was detected. Thus, according to the brake force control apparatus of the present embodiment, an execution of the determination process can be prevented from being wastefully repeated during a process for the rate of change being attenuated after the braking operation caused by the external disturbance was performed.

Figure 6:
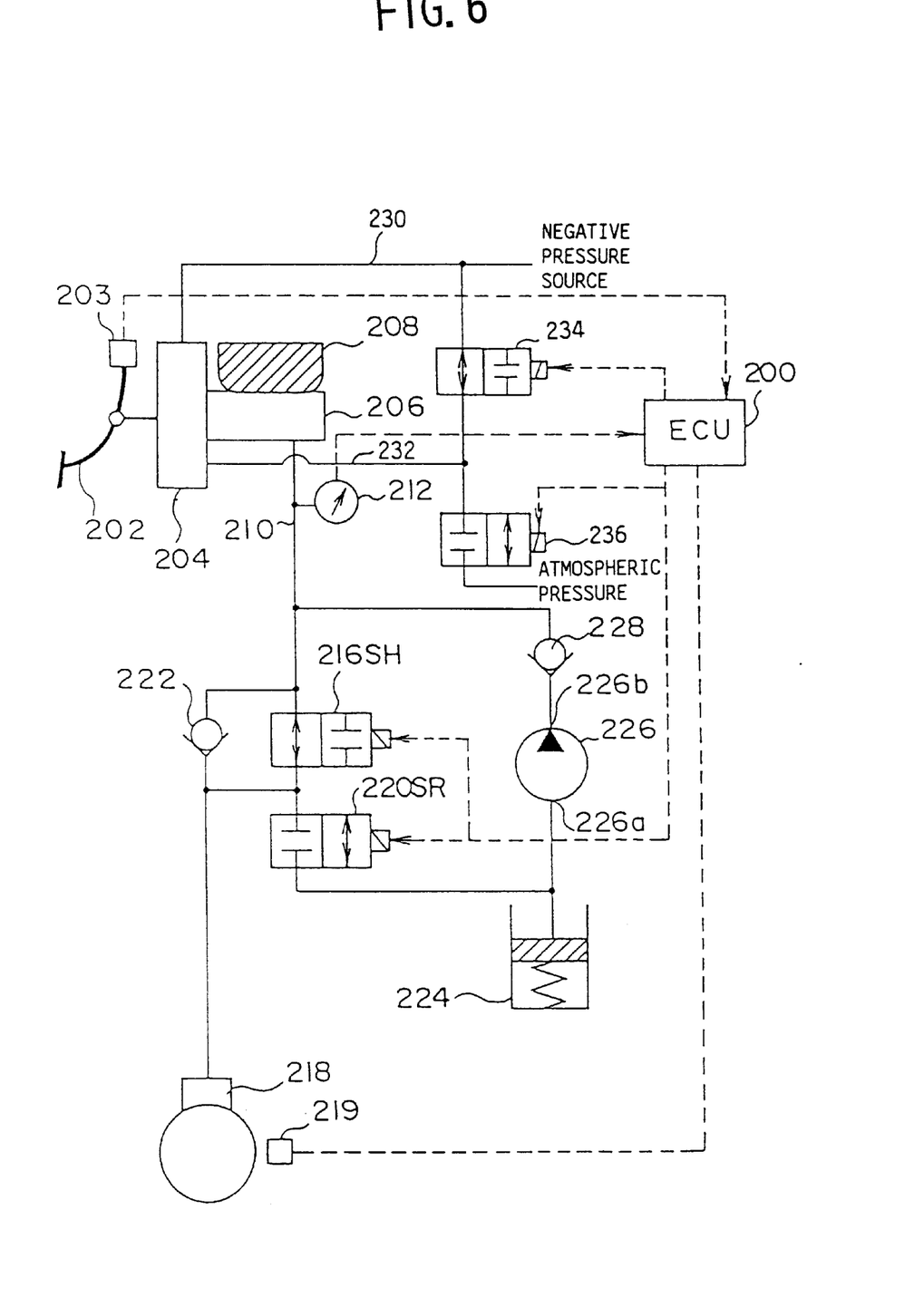
FIG. 6, is a system structure diagram of a brake force control apparatus according to a third embodiment of the present invention.

A description will now be given, with reference to FIG. 6, of a third embodiment according to the present invention. FIG. 6 shows a system structure diagram of a brake force control apparatus according to the present embodiment. It should be noted that, in FIG. 6, only a part of the brake force control apparatus corresponding to one wheel is shown for the sake of convenience of description.

The brake force control apparatus shown in FIG. 6 is controlled by an ECU 200. The brake force control apparatus according to the present embodiment has a brake pedal 202. A brake switch 203 is provided near the brake pedal 202. The brake switch 203 is a switch which generates an ON output when the brake pedal 202 is pressed. The output signal of the brake switch 203 is supplied to the ECU 200. The ECU 200 determines whether or not a braking operation is being performed based on the output signal of the brake switch 203.

The brake pedal 202 is connected to a vacuum booster 204. The vacuum booster 204 is an apparatus which assists a brake pressing force by using an intake negative pressure of an internal combustion engine as a power source. A master cylinder 206 is fixed to the vacuum booster 204. The vacuum booster 204 transmits a resultant force of the brake pressing force $F_P$ which is applied to the brake pedal 206 and the brake assist force $F_A$ which is generated by itself to the master cylinder 206.

The master cylinder 206 has a fluid pressure chamber therein. Additionally, a reservoir tank 208 is provided above the master cylinder 206. The fluid pressure chamber of the master cylinder and the reservoir tank 208 communicate with each other when a press of the brake pedal 202 is released, whereas they are disconnected from each other when the brake pedal is pressed. Accordingly, brake fluid is supplied to the fluid pressure chamber each time the press of the brake pedal 202 is released.

The fluid pressure chamber of the maser cylinder 206 communicates with a fluid pressure passage 210. The fluid pressure passage 210 is provided with a hydraulic pressure sensor 212 which outputs an electric signal corresponding to a pressure inside the fluid pressure passage 210. The output signal of the hydraulic pressure sensor 212 is supplied to the ECU 200. The ECU 200 detects a fluid pressure generated by the master cylinder 206, that is, the master cylinder pressure $P_{M/C}$ based on the output signal of the hydraulic pressure sensor 212.

The fluid pressure passage 210 is provided with a holding solenoid 216 (hereinafter, referred to as SH 216). The SH 216 is a two-position solenoid valve which maintains an open state in a normal state (OFF state). The SH 216 is set to be in an ON state (closed state) by a drive signal being supplied by the ECU 200.

The downstream side of the SH 216 communicates with a wheel cylinder 218 and a pressure decreasing solenoid 220 (hereinafter, referred to as SR220). The SR 220 is a two-position solenoid valve which maintains a closed state in a normal state (OFF state). SR 220 is set to be in an ON state (open state) by a drive signal being supplied by the ECU 200. Additionally, a check valve 222 which permits a fluid flow only in a direction from the wheel cylinder 218 to the fluid pressure passage 210 is provided between the wheel cylinder 218 and the fluid pressure passage 210.

A wheel speed sensor 219 which generates a pulse signal each time the wheel rotates a predetermined angle is provided near the wheel cylinder 218. An output signal of the wheel speed sensor 219 is supplied to the ECU 200. The ECU 200 detects a wheel speed based on the output signal of the wheel speed sensor 219.

A reservoir 224 is provided on the downstream side of the SR 220. The brake fluid flowing out of the SR 220 when the SR 220 is set to be in the ON state (open state) is stored in the reservoir 224. It should be noted that the reservoir previously stores a predetermined amount of brake fluid. The reservoir 224 communicates with an inlet port 226a of a pump 226. Additionally, an outlet port 226b of the pump 226 communicates with the fluid pressure passage 210 via a check valve 228. The check vale 228 is a one-way valve which permits a fluid flow only in a direction from the pump 226 to the fluid pressure passage 210.

The vacuum booster 204 communicates with a negative pressure passage 230 and a pressure adjusting passage 232. The negative pressure passage 230 communicates with a negative pressure source such as an intake system of an internal combustion engine. On the other hand, the pressure adjusting passage 232 communicates with a negative pressure introducing valve 234 and an atmospheric pressure introducing valve 236. The negative pressure introducing valve 234 is a two-position solenoid valve located between the pressure adjusting passage 232 and the negative pressure passage 230, and maintains an open state ins a normal state (OFF state). On the other hand, the atmospheric pressure introducing valve 236 is a two-position solenoid valve which controls a communication between the pressure adjusting passage 232 and an atmosphere, and maintains a closed state in a normal state (OFF state). The negative pressure introducing valve 234 and the atmospheric pressure introducing valve 236 are caused to be an ON state (closed state or open state) by drive signals being supplied from the ECU 200.

The vacuum booster 204 has a negative pressure chamber and a pressure changing chamber separated from each other by a diaphragm therein. The negative pressure chamber communicates with the negative pressure passage 230, and is maintained at a predetermined negative pressure during an operation of the vehicle. The pressure-changing chamber communicates with the pressure adjusting passage 232 and an atmospheric space via a valve mechanism, which adjusts a pressure inside the pressure-changing chamber. The valve mechanism associates with an operation of the brake pedal 202, and operates as follows.

When a negative pressure is introduced into the pressure adjusting passage 232, the valve mechanism causes the pressure changing chamber to communicate with the atmospheric space until a pressure difference corresponding to the brake pressing force $F_P$ is generated between the pressure changing chamber and the negative pressure chamber. In this case, an urging force corresponding to the pressure difference between the pressure changing chamber and the negative pressure chamber, that is, the urging force corresponding to the brake pressing force $F_P$ is exerted on the diaphragm. The vacuum booster 204 transmits the urging force to the master cylinder 206 as the brake assist force $F_A$. Additionally, the valve mechanism introduces an atmospheric pressure to the pressure changing chamber irrespective of the brake pressing force $F_P$ when the atmospheric pressure is introduced into the pressure adjusting passage 232. In this case, an urging force corresponding to a pressure difference between a pressure inside the negative pressure chamber and the atmospheric pressure is exerted on the diaphragm, and a maximum brake assist force $F_{MAX}$ is generated by the vacuum booster.

A description will now be given of an operation of the brake force control apparatus according to the present embodiment. In the system according to the present embodiment, when the ECU 200 performs the normal control, both the negative pressure introducing valve 234 and the atmospheric pressure introducing valve 236 are maintained to be the OFF state. In this case, the vacuum booster 204 generates the brake assist force $F_A$ corresponding to the brake pressing force $F_P$ as mentioned above. As a result, a resultant force of the brake pressing force $F_P$ and the brake assist force $F_A$ is transmitted to the master cylinder 206.

When the resultant force of the brake assist force $F_A$ and the brake pressing force $F_P$ is transmitted to the master cylinder 206, the master cylinder 206 generates a master cylinder pressure $P_{M/C}$ having a predetermined power ratio with respect to the brake pressing force $F_P$. The ECU 200 turns off the SH 216 and SR 220 and maintains the pump 226 at a stopped state when a state of the vehicle is stable. Hereinafter this state is referred to as a stopped state. When the hydraulic circuit is set to the normal state, the master cylinder pressure $P_{M/C}$ is introduced into the wheel cylinder 218 as it is. Accordingly, the brake force generated in the wheel cylinder 218 is adjusted to a level corresponding to the brake pressing force $F_P$.

If a slip rate S of a wheel exceeds a predetermined value after the braking operation is started, the ECU 200 starts the ABS control similar to the ECU 10 of the above-mentioned first embodiment. The ABS control is achieved by driving the SH 216 and the SR 220 while operating the pump 226 as mentioned below when the brake pedal 202 is pressed, that is, when the master cylinder pressure $P_{M/C}$ is appropriately increased.

If the SH 216 is set to the open state and the SR 220 is set to the closed state in a state in which the master cylinder pressure $P_{M/C}$ is appropriately increased, the wheel cylinder pressure $P_{W/C}$ can be increased up to the master cylinder pressure $P_{M/C}$ as an upper limit value. Hereinafter, this state is referred to a as pressure-increasing mode ①. Under the same circumstances, the wheel cylinder pressure $P_{W/C}$ can be maintained by the SH 216 being set to the closed state and the SR 220 being set to the closed state. Additionally, the wheel cylinder pressure $P_{W/C}$ can be decreased by the SH 216 being set to the open state and the SR 220 being set to the open state. Hereinafter, these states are referred to as a holding mode ② and a pressure-decreasing mode ③, respectively. The ECU 200 achieves, if necessary, the above-mentioned pressure-increasing mode ①, holding mode ② and pressure-decreasing mode ③ so that a slip rate S of the wheel becomes an appropriate value.

When a depression of the brake pedal 202 is released by the driver during execution of the ABS control, the wheel cylinder pressure $P_{W/C}$ must be immediately decreased. In the system according to the present embodiment, the check valve 222 is provided in the hydraulic circuit corresponding to the wheel cylinder 218. The check valve 222 permits a fluid flow only in the direction from the wheel cylinder 218 to the master cylinder 206. Thus, according to the system of the present embodiment, the wheel cylinder pressure $P_{W/C}$ of the wheel cylinder 222 can be immediately decreased after the depression of the brake pedal 202 is released.

In the system according to the present embodiment, when the ABS control is performed, the wheel cylinder pressure $P_{W/C}$ is increased by the master cylinder 206 as a fluid pressure source. Additionally, the wheel cylinder pressure $P_{W/C}$ is decreased by having the brake fluid in the wheel cylinder flow to the reservoir 224. Accordingly, if the pressure-increasing mode and the pressure-decreasing mode are repeatedly performed, the brake fluid in the master cylinder 206 gradually flows to the reservoir 224. However, in the system according to the present embodiment, the brake fluid in the reservoir 224 is delivered to the master cylinder 206 by the pump 226. Thus, if the ABS control is continued for a long time, a so-called bottoming of the master cylinder does not occur.

The ECU 200 performs the brake assist control after an emergency braking operation is performed by the driver. The brake assist control is achieved by turning on both the negative pressure introducing valve 234 and the atmospheric pressure introducing valve 236, that is, by closing the negative pressure introducing valve 234 and opening the atmospheric pressure introducing valve 236.

When the brake assist control is started in the system of the present embodiment, an atmospheric air is introduced into the pressure adjusting passage 232. As mentioned above, when an atmospheric air is introduced into the pressure adjusting passage 232, the vacuum booster 204 generates a maximum brake assist force $F_{AMAX}$. Accordingly, after the brake assist control is started, a resultant force of the maximum brake assist force $F_{AMAX}$ and the brake pressing force $F_P$ is transmitted to the master cylinder 206.

After the execution condition of the brake assist control is established and until the execution condition of the ABS control is established, the ECU 200 causes the hydraulic circuit connected to the master cylinder 206 to be a normal state. In this case, the master cylinder pressure $P_{M/C}$ is introduced into the wheel cylinder 218. Accordingly, the wheel cylinder pressure $P_{W/C}$ is rapidly increased from a pressure corresponding to "$F_A+F_P$" to a pressure corresponding to "$F_{AMAX}+F_P$" when the brake assist control is started.

As mentioned above, according to the system of the present embodiment, when an emergency braking operation is performed, the wheel cylinder pressure $P_{W/C}$ can be increased to a sufficiently large value as compared to the brake pressing force $F_P$. Thus, according to the system of the present embodiment, a large brake force can be generated immediately after a condition in which an emergency braking is required occurs even if the driver is a beginner-grade driver.

After the wheel cylinder pressure $P_{W/C}$ is rapidly increased as mentioned above, the slip rate S of the wheel is rapidly increased, and finally a condition for executing the ABS control is established. When the condition for executing the ABS control is established, the ECU 200 prevents generation of an improperly large slip rate S by appropriately achieving the above-mentioned pressure-increasing mode ①, holding mode ② and pressure-decreasing mode ③.

In the system according to the present embodiment, a period during which a brake pressing force $F_P$ is applied to the brake pedal 202 after the brake assist control is started, the master cylinder pressure $P_{M/C}$ is maintained to a pressure corresponding to "$F_{AMAX}+F_P$". On the other hand, when a depression of the brake pedal 202 is released after the brake assist control was started, the master cylinder pressure $P_{M/C}$ is decreased to a pressure corresponding to "$F_{AMAX}$".

Accordingly, by monitoring the output signal of the master cylinder pressure $P_{M/C}$ detected by the hydraulic pressure sensor 212, the ECU 200 can determine whether or not the depression of the brake pedal 202 is released. Upon detection of the release of the depression of the brake pedal 202, the ECU 200 stops supply of the drive signals to the negative pressure introducing valve 234 and the atmospheric pressure introducing valve 236, and terminates the brake assist control.

The brake force control apparatus according to the present embodiment has a feature, similar to the ECU 10 in the above-mentioned first embodiment and second embodiment, that the ECU 200 determines whether or not the brake assist control should be performed by performing the routine shown in FIG. 4 or FIG. 5.

That is, the ECU 200 determines whether or not a start condition for the brake assist control is established based on the master cylinder pressure $P_{M/C}$ and the rate of change $\Delta P_{M/C}$ thereof after the brake pedal 202 was pressed. Additionally, the ECU 200 determines whether or not the cause of the braking operation is an emergency braking operation by the driver or an external disturbance such as a rough road based on a time needed for the rate of change $\Delta P_{M/C}$ to be less than the second threshold value $\beta$ after the rate of change $\Delta P_{M/C}$ exceeded the first threshold value $\alpha$.

Then, the ECU 200 starts the brake assist control when it is determined that a cause of a braking operation is an emergency braking operation by a driver. On the other hand, the ECU 200 prohibits an execution of the brake assist control when it is determined that the cause of the braking operation is an external disturbance such as a rough road or a step.

Thus, according to the brake force control apparatus of the present embodiment, similar to the cases of the above-mentioned first and second embodiments, an unnecessary execution of the brake assist control can be prevented when the brake pedal 202 is instantaneously operated at a high speed due to an external disturbance such as a rough road or a step.

What is claimed is:

1. A brake force control apparatus performing a brake assist control by adjusting a wheel cylinder pressure to a fluid pressure greater than a normal pressure when an emergency braking operation is performed by a driver, the brake force control apparatus comprising:

emergency braking operation detecting means for preliminarily determining that an emergency braking operation is being performed when a detected operational speed of the brake exceeds a predetermined value;

operational cause discriminating means for determining based on an increasing and decreasing frequency of a rate of change in an amount of a braking operation whether the preliminarily determined emergency braking operation is an intentionally performed actual emergency braking operation wherein, when the preliminarily determined emergency braking operation is not an actual emergency braking operation, the operational cause discriminating means determines that the preliminarily determined emergency braking operation is a result of an external disturbance; and brake assist control prohibiting means for prohibiting execution of said brake assist control when the preliminarily determined emergency braking operation is the result of an external disturbance.

2. The brake force control apparatus as claimed in claim 1, wherein said emergency braking operation detecting means detects the operational speed of the brake based on a rate of change ($\Delta P_{M/C}$) of a master cylinder pressure.

3. The brake force control apparatus as claimed in claim 1, wherein said emergency braking operation detecting means detects the operational speed of the brake based on a brake pressing force ($F_P$).

4. The brake force control apparatus as claimed in claim 1, wherein said emergency braking operation detecting means detects the operational speed of the brake based on an amount of stroke (L) of a brake pedal.

5. The brake force control apparatus as claimed in claim 1, wherein said emergency braking operation detecting means detects the operational speed of the brake based on a deceleration (G) of the vehicle.

6. The brake force control apparatus as claimed in claim 1, wherein said emergency braking operation detecting means detects an operational speed of the brake based on a wheel speed ($V_W^{**}$).

7. The brake force control apparatus as claimed in claim 1, wherein said operational cause discriminating means includes first discriminating means for determining that the cause of said emergency braking operation is the external disturbance when the operational speed of the brake increases and decreases with a period shorter than a predetermined period.

8. The brake force control apparatus as claimed in claim 1, wherein said operational cause discriminating means includes:

a counter (C) counting a time after the operational speed of the brake exceeds a first threshold value ($\alpha$) and until the operational speed reaches a second threshold value; and a second discriminating means for determining that the cause of said emergency braking operation is the external disturbance when a time counted by said counter is shorter than a predetermined time ($T_0$).

9. The brake force control apparatus as claimed claim 1, comprising:

detecting operation prohibiting means for prohibiting a detecting operation of an emergency braking operation performed by said emergency braking operation detecting means for a predetermined period ($T_H$) after the cause of the emergency braking operation detected by said emergency braking operation detecting means is determined to be the external disturbance by said operational cause discriminating means.

* * * * *